(12) United States Patent
Millar

(10) Patent No.: US 7,456,904 B2
(45) Date of Patent: Nov. 25, 2008

(54) METHOD AND APPARATUS FOR SUPERIMPOSING CHARACTERS ON VIDEO

(75) Inventor: Greg Max Millar, Coarsegold, CA (US)

(73) Assignee: Pelco, Inc., Clovis, CA (US)

( * ) Notice: Subject to any disclaimer, the term of this patent is extended or adjusted under 35 U.S.C. 154(b) by 637 days.

(21) Appl. No.: 11/233,340

(22) Filed: Sep. 22, 2005

(65) Prior Publication Data

US 2007/0064127 A1    Mar. 22, 2007

(51) Int. Cl.
*H04N 5/262* (2006.01)

(52) U.S. Cl. .................. 348/589; 348/600; 348/599; 348/598; 348/239; 348/569; 345/629; 345/636

(58) Field of Classification Search .......... 348/589, 348/598, 599, 600, 586, 591, 584, 239, 578, 348/563, 569; 345/629, 630, 636
See application file for complete search history.

(56) References Cited

U.S. PATENT DOCUMENTS

| 5,526,050 | A | | 6/1996 | King et al. |
| 5,594,850 | A | * | 1/1997 | Noyama et al. ............. 345/632 |
| 6,707,505 | B2 | * | 3/2004 | Kuo et al. ................... 348/584 |
| 6,909,438 | B1 | * | 6/2005 | White et al. ................ 345/629 |
| 7,274,369 | B1 | * | 9/2007 | Bastos et al. ............... 345/531 |
| 2003/0011715 | A1 | * | 1/2003 | Kastelic ...................... 348/589 |
| 2003/0058354 | A1 | | 3/2003 | Parulski et al. |
| 2003/0133041 | A1 | | 7/2003 | Curtis et al. |
| 2004/0130637 | A1 | | 7/2004 | Kake et al. |
| 2005/0168483 | A1 | * | 8/2005 | Hirata ......................... 345/629 |
| 2006/0170707 | A1 | * | 8/2006 | Kokemohr .................. 345/629 |
| 2007/0008329 | A1 | * | 1/2007 | Park ............................ 345/555 |
| 2007/0103489 | A1 | * | 5/2007 | MacInnis et al. ............ 345/629 |

FOREIGN PATENT DOCUMENTS

EP    1 434 171 A2    6/2004

* cited by examiner

*Primary Examiner*—David Ometz
*Assistant Examiner*—Jean W Désir
(74) *Attorney, Agent, or Firm*—Paul T. Kashimba, Esq.

(57) ABSTRACT

A method and apparatus for superimposing a character on video for display on a video screen comprising providing a system capable of displaying a plurality of RGB pixel values on a video screen, designating a portion of the plurality of RGB pixel values to have special values, receiving video data having a first plurality of RGB pixel values for display on a video screen, superimposing a character on the video data to create a composite video having a second plurality of RGB pixel values for display on a video screen, determining if a first RGB pixel value from the second plurality of RGB pixel values is in the designated portion of the plurality of RGB pixel values, displaying the first RGB pixel value if the first RGB pixel value is not in the designated portion of the plurality of RGB pixel values, determining the special value for the first RGB pixel value if first the RGB pixel value is in the designated portion of the plurality of RGB pixel values, and displaying the determined special value for the first RGB pixel value.

19 Claims, 6 Drawing Sheets

METHOD AND APPARATUS FOR SUPERIMPOSING CHARACTERS ON VIDEO

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

This invention relates generally to superimposing a character on video and in particular to superimposing a character on a video image displayed on a monitor in a video surveillance system. As used herein, character includes letters, numbers, symbols, and graphics.

Prior art systems have used text overlay and antialiasing methods to overlay text on video images from surveillance cameras. This overlaid text can provide various information such as date, time, camera being displayed and so forth. The quality of the video text provided has been limited by the standard window graphics packages available. These graphics packages only provide red, green and blue functionality for each pixel. To take advantage of the additional functionality of the underlying hardware, it has been necessary in the past to design a special window graphic package for the particular application thereby significantly increasing the complexity and cost of the final system. As a result, the prior art video surveillance systems have simply used the limited capability of the standard red, green and blue functionality of standard window graphics packages. This has resulted in overlaid text that has lacked the desired crisp, well-defined alphanumeric characters on the screen that are pleasing to the viewer's eyes.

SUMMARY OF THE INVENTION

In accordance with the present invention there is provided a method of superimposing a character on video for display on a video screen. The method comprises the steps of providing a system capable of displaying a plurality of RGB (red, green, blue) pixel values on a video screen, designating a portion of the plurality of RGB pixel values to have special values, receiving video data having a first plurality of RGB pixel values for display on a video screen, superimposing a character on the video data to create a composite video having a second plurality of RGB pixel values for display on a video screen, determining if a first RGB pixel value from the second plurality of RGB pixel values is in the designated portion of the plurality of RGB pixel values, displaying the first RGB pixel value if the first RGB pixel value is not in the designated portion of the plurality of RGB pixel values, determining the special value for the first RGB pixel value if the first RGB pixel value is in the designated portion of the plurality of RGB pixel values; and displaying the determined special value for the first RGB pixel value.

In one embodiment of the present invention the method comprises using a lookup table to determine the special value. This lookup table may have special values for a plurality of entries for a color with a plurality of different alpha values. The method also comprises creating a lookup table having two RGB colors with a plurality of alpha values to blend from a first color of the two RGB colors to a second color of the two RGB colors. These colors may be for letters, numbers, symbols, or background boxes for the letters, numbers or symbols.

In another embodiment of the invention the method may comprise the step of determining if a first RGB pixel value from the second plurality of RGB pixel values is in the designated portion of the plurality of RGB pixel values comprises determining if one of the RGB pixel values is greater than a predetermined value or, in an alternative embodiment, if one of the pixels is in a range of predetermined values.

Still further the present invention comprises a method wherein the step of designating a portion of the plurality of RGB pixel values to have special values comprises choosing a set of pixels near the maximum value for RGB pixel values such that the first color, second color and transparent are located on different vertices of a cube having R, G, and B plotted on different axes.

The present invention provides a method and apparatus for superimposing characters on a video image to create crisp, well-defined, antialiased letters, numbers, symbols and graphics that are pleasing to the eye of the user while still allow the cost savings of using a standard window graphic package. The present invention provides a method and apparatus that utilizes a portion of the normal RGB values and assigns special value to the designated portion so that the system can take advantage of the functional capability of the system hardware to use the alpha factor for the pixel so that the superimposed characters can be mapped or blended by varying the transparency of the color displayed by a pixel. The pixels in the designated portion have RGBα (red, green, blue, alpha) values. A lookup table provides an efficient manner of implementing the invention; however, an algorithm can also be used to determine the appropriate RGBα values for the pixel.

The present invention also provides an apparatus for superimposing a character on video for display on a video screen. The apparatus comprises a processor for displaying a plurality of RGB pixel values on a video screen. The processor designates a portion of the plurality of RGB pixel values to have special values. An input is adapted for receiving video data having a first plurality of RGB pixel values for display on a video screen. The processor is adapted to superimpose a character on the video data received by the input to create a composite video having a second plurality of RGB pixel values for display on a video screen. The processor determines if a first RGB pixel value from the second plurality of RGB pixel values is in the designated portion of the plurality of RGB pixel values and generates a signal to display the first RGB pixel value if the first RGB pixel value is not in the designated portion of the plurality of RGB pixel values and generates a signal to display the special value for the first RGB pixel value if the first RGB pixel value is in the designated portion of the plurality of RGB pixel values.

Other advantages and applications of the present invention will be made apparent by the following detailed description of the preferred embodiment of the invention.

DETAILED DESCRIPTION OF THE INVENTION

Figure 1:
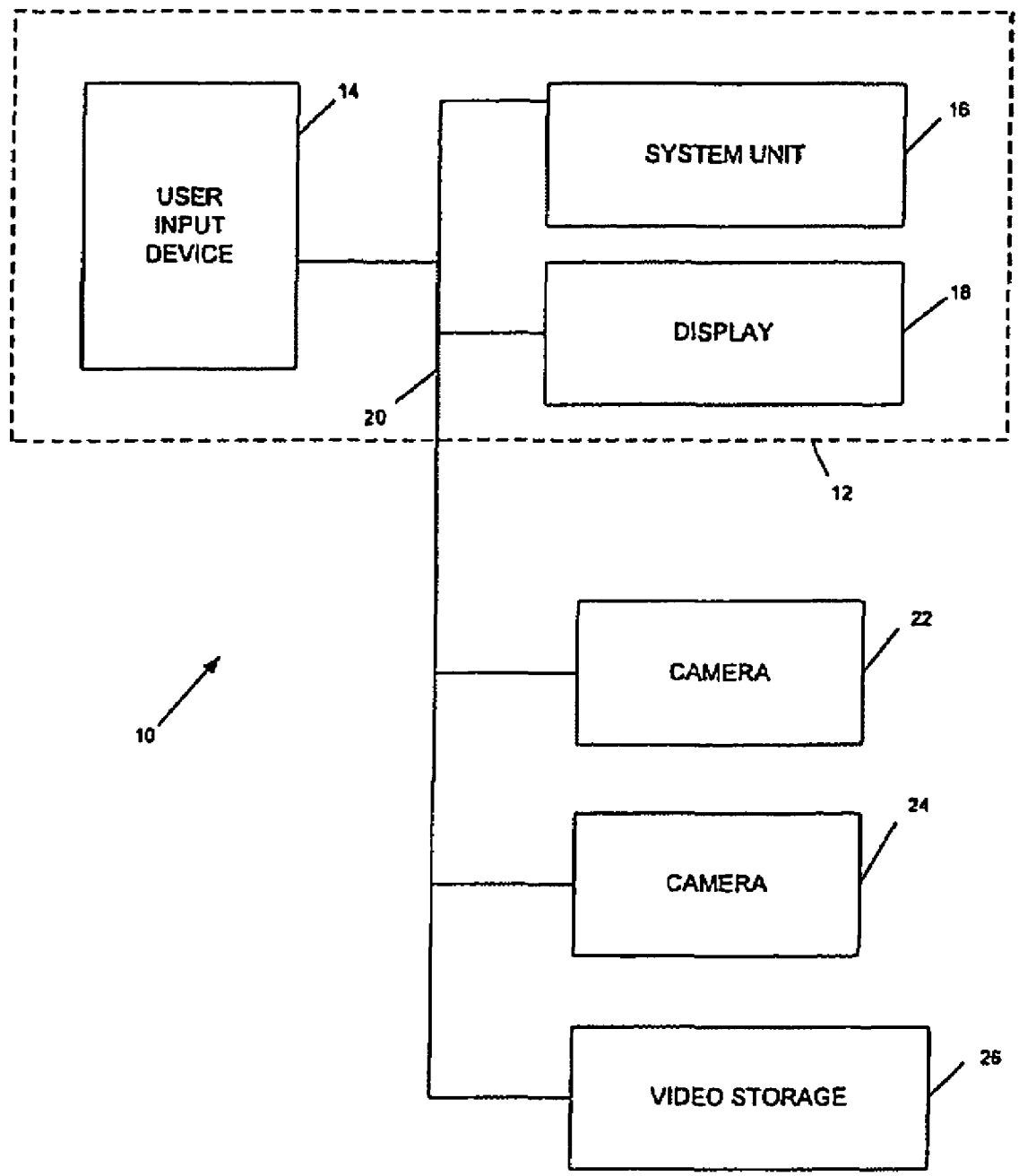
FIG. 1 is a block diagram of a video surveillance system utilizing the present invention.

Referring to FIG. 1, a surveillance system 10 is shown utilizing the present invention in workstation 12, which comprises a user input device 14, system unit 16 and display 18. Workstation 12 is connected via network 20 to a plurality of cameras which are illustrated by cameras 22 and 24. Workstation 12 is also connected via network 20 to video storage 26 which can be an analog or digital recorder as is known in the art. Network 20 can be a hard-wired closed network, local area network, or wide area network such as the Internet. Cameras 22 and 24 provide live video images to workstation 12 for viewing on display 18. Video storage 26 provides prerecorded video from cameras 22 and 24 of from another device to workstation 12 for display on display 18. User input device 14, which can be, for example, a controller, keyboard, mouse, and so forth, provides video input to system unit 16 for controlling display 18, cameras 22 and 24 and video storage 26 as is known in the art.

Figure 2:
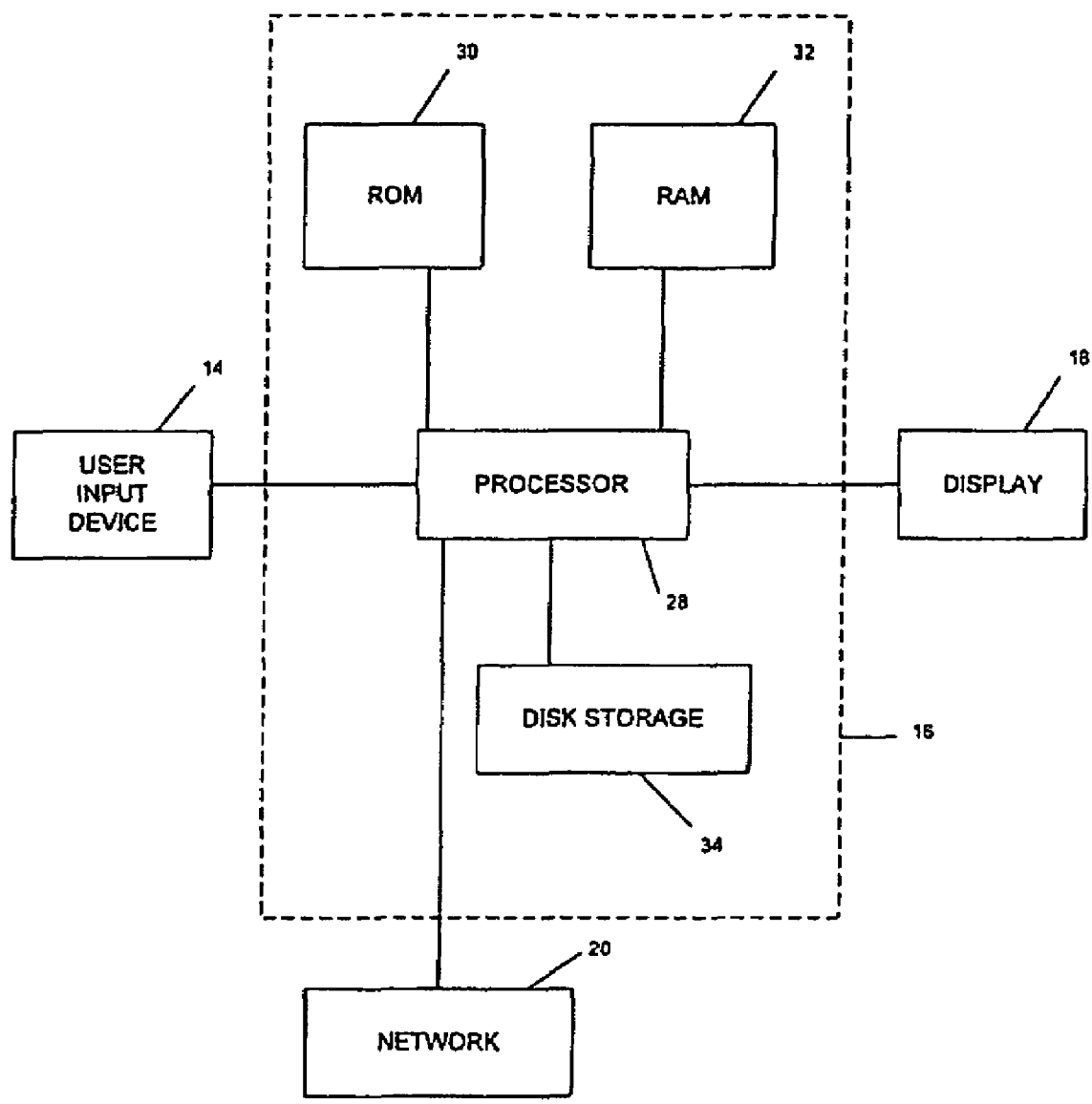
FIG. 2 is a block diagram of a system in the video surveillance system utilizing the present invention.

FIG. 2 illustrates an exemplary system unit 16 incorporating the present invention. System unit 16 has a processor 28 which is connected to ROM 30, RAM 32, and disk storage 34. Processor 28 includes graphics capability and implements the algorithms and programs of the present invention that are stored in ROM 30 or disk storage 34 as well as a standard windows graphic package. Video images are provided to processor 28 from network 20. Processor 28 utilizes text overlay and antialiasing techniques as is known in the art to superimpose the appropriate alphanumeric characters, such as date, time, camera identification and so forth along with graphics, such as background boxes associated with such alphanumeric characters, on the video image for display on the video screen of display 18. In addition, processor 28 applies the methods and techniques of the present invention as described in FIGS. 3-7 to improve the appearance of the characters, such as letters, numbers, symbols and graphics, superimposed on the video displayed on display 18. User input device 14 can be used to control the display on display 18 and to control the devices on network 20 as is known in the art. System unit 16 can be used to both control network devices and generate the signals to create the display on the video screen of display 18, or system unit 16 can just generate the signals to create the display on the video screen of display 18.

Figure 3:
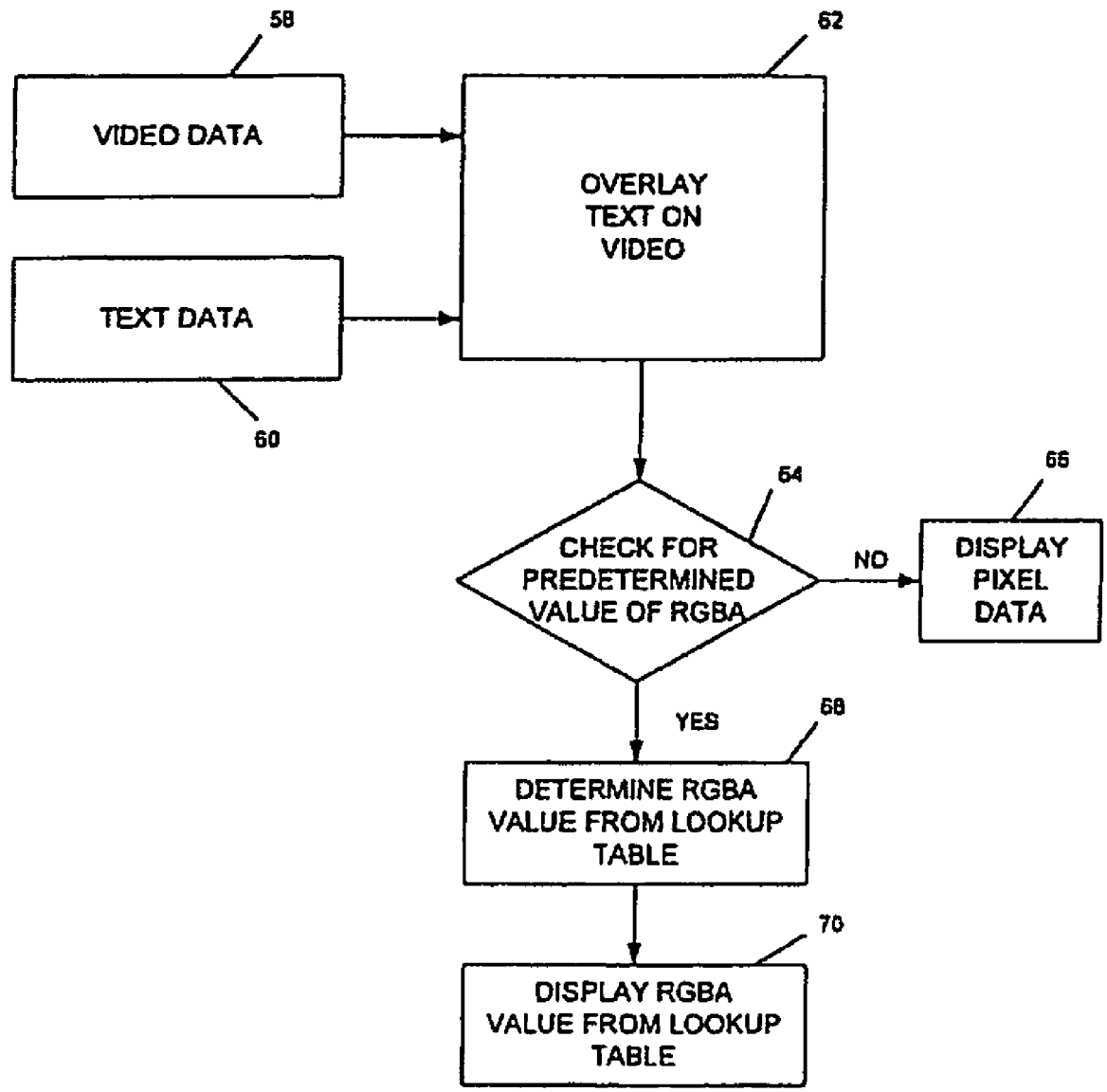
FIG. 3 is a flowchart illustrating one embodiment of the method of the present invention.

FIG. 3 is a flowchart illustrating one embodiment of the method of the present invention that is implemented by processor 28 of system unit 16. Video data is provided to processor 28 at step 58, for example, from camera 22 in FIG. 1. In addition, the appropriate alphanumeric data for overlaying on the video data is also provided as is known in the art. Processor 28 superimposes the alphanumeric data onto the video data at step 62 to create a composite video signal. At step 64, processor 28 then checks each pixel in the composite video signal to determine if the RGB values have a special value, i.e., in this embodiment they are checked to see if one or more of the RGB component values are greater than a predetermined value, such as 250, which is explained in detail hereinbelow. If the RGB values for the pixel do not have a value greater than a predetermined value, then at step 66 the pixel data is displayed on the video screen of display 18. If one or more of the RGB values for the pixel do have a value greater than a predetermined value, then at step 68, processor 28 determines an RGBα value from a lookup table that can be archived in ROM 30 or disk storage 34 and held in RAM 32 during normal operation for efficient operation. The special value given in the lookup table for the pixel data includes RGB values as well as an alpha value to provide for mapping or blending of the color to enhance the crispness and definition of the characters. The RGBα values are linear interpolations of the foreground and background colors specified when rending the characters. The lookup table provides various alpha values to provide for different levels of transparency of, for example, letters that are black, white, black on white, or white on black. The table also provides values for background colors for use with the characters and provides for transparency as well in blending with the underlying video. All of these examples are discussed in more detail in relation to FIG. 7. At step 70, processor 28 generates the signal for displaying the pixel on display 18 based on the RGB and alpha values obtained from the lookup table. It should be noted that although this embodiment of the invention has been described as using a lookup table, an algorithm could be used to determine the appropriate color in real time.

Figure 4:
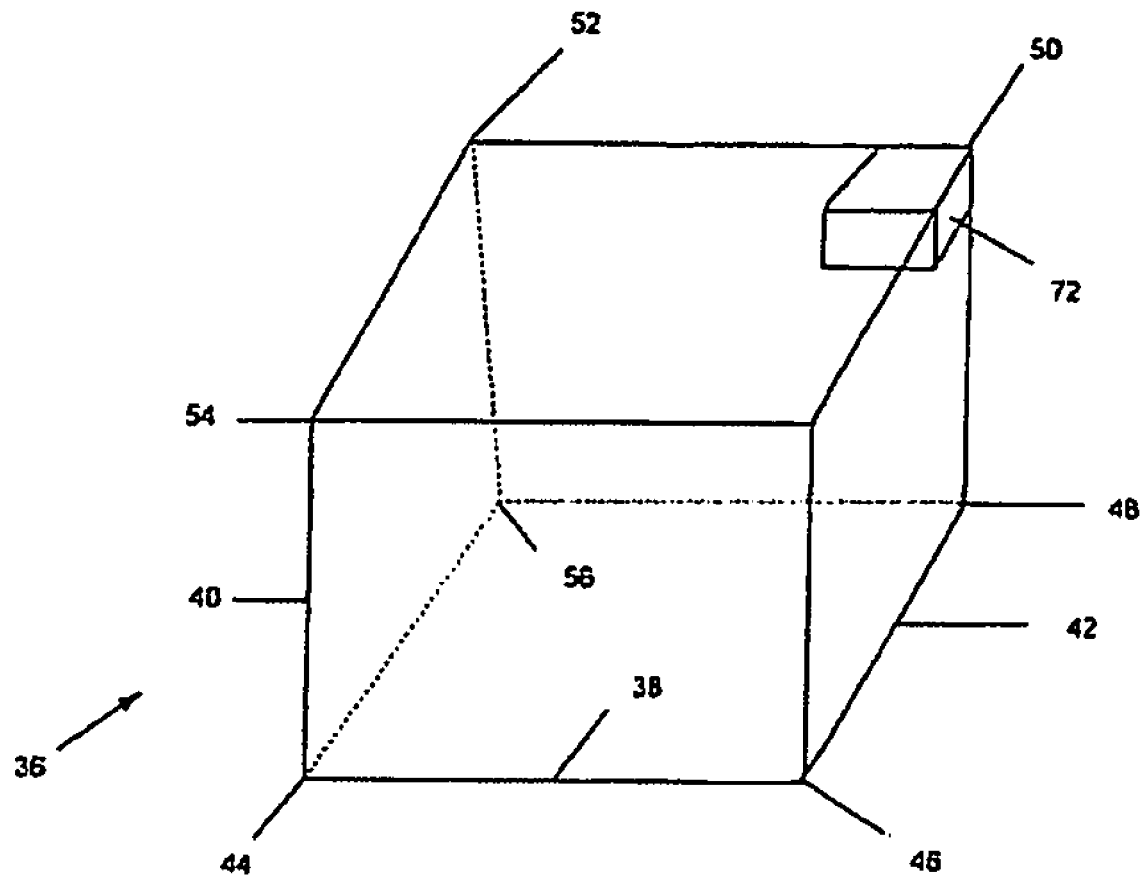
FIG. 4 is a diagram showing the three dimensional relationship of the possible values of RGB for a pixel.

FIG. 4 is a diagram showing the three dimensional relationship of the possible values of RGB for a pixel illustrated by cube 36 which represents the possible values from 0 to 255 for each of the red, green and blue pixels resulting in sixteen million possible colors. This is the typical color palette available with standard 24-bit window graphics packages. The axes of cube 36 indicated by numerals 38, 40, and 42 represent respectively the red, green, and blue color values for a pixel to be displayed on the video screen of display 18 in FIG. 2. Cube 36 has eight corners or vertices 44, 46, 48, 50, 52, 54, and 56 with the RGB values as indicated in Table 1 below.

TABLE 1

| Vertex | Red | Green | Blue |
|---|---|---|---|
| 44 | 0 | 0 | 0 |
| 46 | 255 | 0 | 0 |
| 48 | 255 | 0 | 255 |
| 50 | 255 | 255 | 255 |
| 52 | 0 | 255 | 255 |
| 54 | 0 | 255 | 0 |
| 56 | 0 | 0 | 255 |

Figure 5:
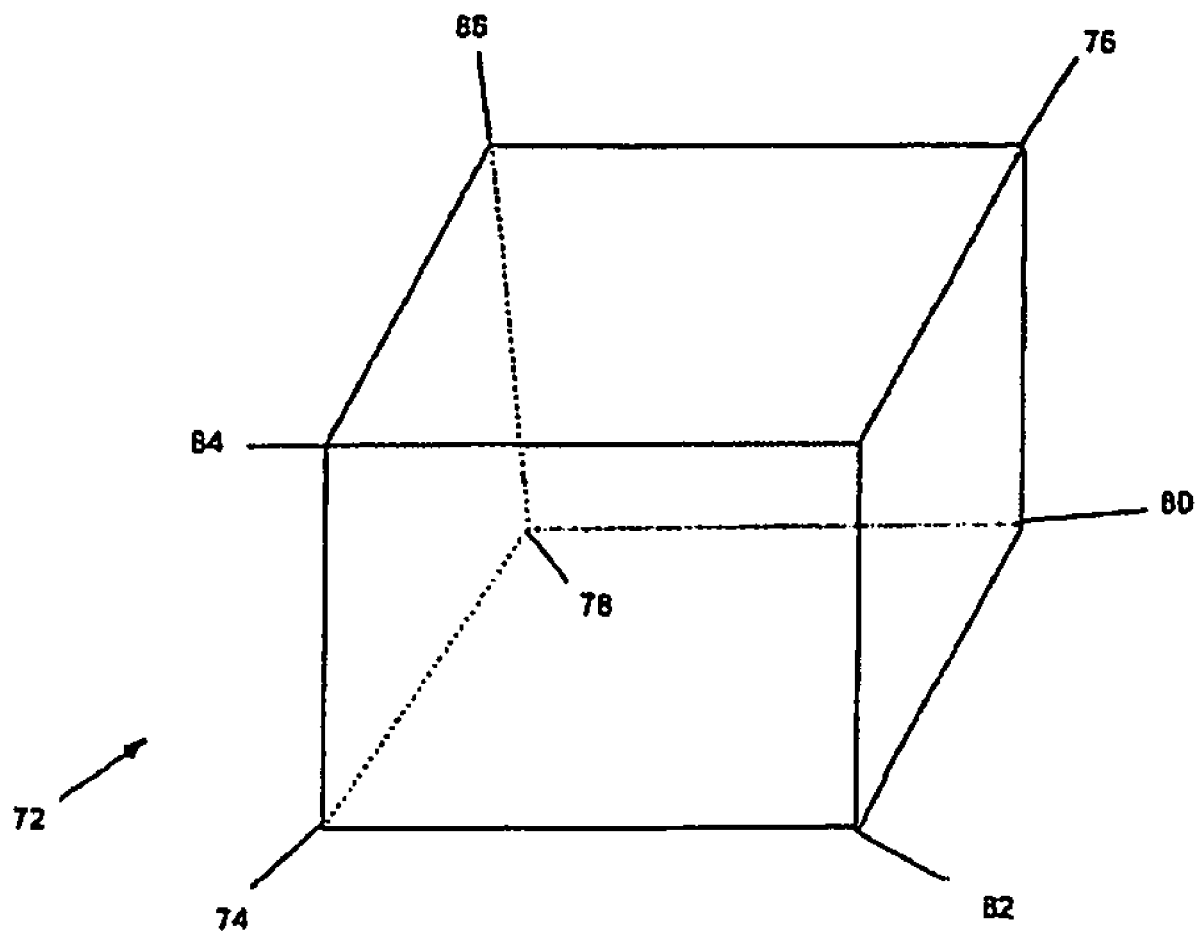
FIG. 5 is a diagram showing the relationship of the special values in the lookup table of the present invention.

FIG. 5 a diagram showing the three dimensional relationship of the special values in the lookup table that enables the present invention to provide a four dimensional space of RGBα when the standard windows graphics package is only capable of providing three dimensional RGB for a pixel. The location of cube 72 in relation to the RGB values in cube 36 is shown in FIG. 4. The RGB values in cube 72 range from 250, 250, 250 at vertex 74 to 255, 255, 255 at vertex 76. Accordingly, the RGB range available for normal color display is from 000, 000, 000 to 249, 249, 249 instead of to 255, 255, 255. The color white for normal windows graphics use is now designated as 249, 249, 249 rather than 255, 255, 255. All unmapped RGB pixel values, i.e., all RGB values that are outside cube 72, default to a fixed alpha value, for example, 255 equals opaque. The vertices for cube 72 are as follows: 76, which is 255, 255, 255, is the color white and mapped to the opaque color white since in many graphics or windowing systems this is a default color for rendering; 78, which is 250, 250, 255, is mapped to the opaque color black for characters (0, 0, 0, 255); 80, which is 255, 250, 255, is transparent (0, 0, 0, 0) for blending with the underlying video layer; 82, which is 255, 250, 250, is a first background color mapped to any arbitrary RGBα for use with characters; 84, which is 250, 255, 250, is a second background color for use with characters; 86, which is 250, 255, 255, is a third background color for use with characters; 88, which is 255, 255, 250, is a fourth background color for use with the characters; and 74, which is 250, 250, 250, can be used as a fifth background color or third text color. It can be seen from FIG. 5 that a diagonal line from any vertex to another vertex does not intersect with any other diagonal line from any other vertex to another vertex. This allows the points in between the two vertices to have different alpha values so that for example, white can blend to transparent, black can blend to transparent, and black or white can blend to the chosen background colors. In addition, white can lend to black by providing different colors along the diagonal. The various combinations in this embodiment are shown in Table 2.

TABLE 2

| | | | | |
|---|---|---|---|---|
| White | 255 | 255 | 255 | FFFF |
| Black | 250 | 250 | 255 | 000F |
| Transparent | 255 | 250 | 255 | 0000 |
| Background 1 | 255 | 250 | 250 | RGB α for Background 1 |
| Background 2 | 250 | 255 | 250 | RGB α for Background 2 |
| Background 3 | 250 | 255 | 255 | RGB α for Background 3 |
| Background 4 | 255 | 255 | 250 | RGB α for Background 4 |
| Standard white | 249 | 249 | 249 | FFFF |
| Standard black | 0 | 0 | 0 | 000F |
| Black and White Overlay | | | | |
| White | 255 | 255 | 255 | FFFF |
| | 255 | 254 | 255 | FFFC |
| | 255 | 253 | 255 | FFF9 |
| | 255 | 252 | 255 | FFF6 |
| | 255 | 251 | 255 | FFF3 |
| Transparent | 255 | 250 | 255 | 0000 |
| White | 255 | 255 | 255 | FFFF |
| | 254 | 254 | 255 | CCCF |
| | 253 | 253 | 255 | 999F |
| | 252 | 252 | 255 | 666F |
| | 251 | 251 | 255 | 333F |
| Black | 250 | 250 | 255 | 000F |
| Black | 250 | 250 | 255 | 000F |
| | 251 | 250 | 255 | 000C |
| | 252 | 250 | 255 | 0009 |
| | 253 | 250 | 255 | 0006 |
| | 254 | 250 | 255 | 0003 |
| Transparent | 255 | 250 | 255 | 0000 |
| Black and White Overlay on Background 1 (BG1) | | | | |
| White | 255 | 255 | 255 | FFFF |
| | 255 | 254 | 254 | |
| | 255 | 253 | 253 | |
| | 255 | 252 | 252 | |
| | 255 | 251 | 251 | |
| Background1 | 255 | 250 | 250 | RGB α (BG1) |
| White | 255 | 255 | 255 | FFFF |
| | 254 | 254 | 255 | CCCF |
| | 253 | 253 | 255 | 999F |
| | 252 | 252 | 255 | 666F |
| | 251 | 251 | 255 | 333F |
| Black | 250 | 250 | 255 | 000F |
| Black | 250 | 250 | 255 | 000F |
| | 251 | 250 | 254 | |
| | 252 | 250 | 253 | |
| | 253 | 250 | 252 | |
| | 254 | 250 | 251 | |
| Background1 | 255 | 250 | 250 | RGB α (BG1) |
| Background to Transparent | | | | RGB α (BG1) |
| Background 1 | 255 | 250 | 250 | |
| | 255 | 250 | 251 | |
| | 255 | 250 | 252 | |
| | 255 | 250 | 253 | |
| | 255 | 250 | 254 | |
| Transparent | 255 | 250 | 255 | 0000 |

For example, the text color black at 250, 250, 255 is 000F, thus being black at full intensity. It can be seen from Table 2 that the color black remains constant, i.e., 0, 0, 0, but the alpha value decreases as you approach transparent. Specifically, the alpha value varies from F at 250, 250, 255 to C at 251, 250, 255, to 9 at 252, 250, 255, to 6 at 253, 250, 255, and so forth. From the table it can be seen that white blends to black by changing from white FFF at 255, 255, 255, to CCC at 254, 254, 255, to 999 at 253, 253, 255, and so forth. It should be noted that although the block of RGB values illustrated herein has been chosen near the maximum value of possible RGB values, other blocks could be utilized such as near the minimum value of possible RGB values or other location. In addition, individual values spread throughout the RGB table of values could be used; however, this would significantly increase the overhead required to check to see if the pixel value has a designated special value that must be obtained from the lookup table. In the example described above, only six levels have been chosen because it has been found that generally this is all that is required to provide a crisp, well-defined anti-aliased letter that is pleasing to the viewer's eye. Of course, more or fewer levels of transparency can be used for blending as desired. Using standard antialiasing rendering techniques of standard windowing package specifying a foreground color and background color that correspond to two of the vertices of cube 72, the intervening values between foreground and background are automatically mapped to the proper colors and alpha values to blend with the overlaid video layer.

Any color can occur in an image rendered on top of live video. The pixels with the special values will not exhibit the normal behavior and the expected color will not be displayed. In this embodiment of the invention the special pixels are clustered in the 250-255 range of each color component. Accordingly, the image to be displayed can be pre-processed in various ways. For example, all RGB values greater than 249 can be truncated to 249, which would wash out the detail from the highlights in the image, or the image can be rescaled in the RGB space by multiplying all RGB values by 249/255, which will slightly reduce the overall brightness and dynamic range of the image.

Figure 6:
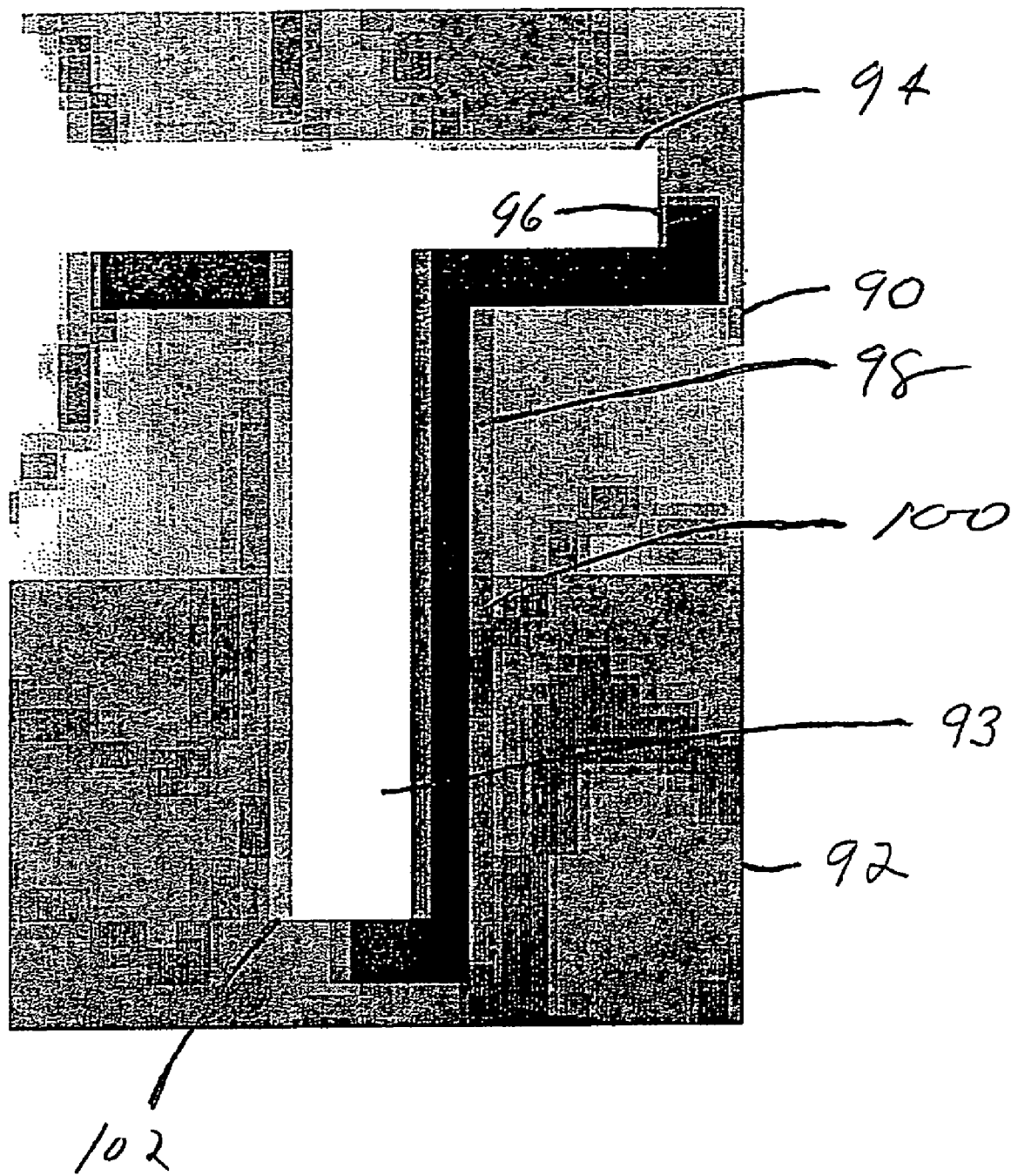
FIG. 6 is an exemplary embodiment of a portion of a sample image produced according to the present invention.

FIG. 6 is an exemplary embodiment of a portion of a sample image produced according to the present invention displayed on the video screen of display 18. The sample image has been enlarged to show some of the various improvements in the creation of superimposed characters according to the present invention. Numeral 90 indicates the simulated video from, for example, a camera. Numeral 92 indicates a rectangle in one of the background colors from the lookup table superimposed on the simulated video. The text character superimposed on the simulated video is indicated by numeral 93. Numeral 94 shows an area of the superimposed text character where the white text is mapped or blended to transparent. Numeral 96 shows an area where the white is mapped to black. Numeral 98 shows an area where black is blended to the map. Numeral 100 shows an area where the black is blended to the background. Numeral 102 shows an area where white is blended to the background.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of superimposing a character on video for display on a video screen comprising the steps of: providing a system capable of displaying a plurality of RGB pixel values on a video screen; designating a portion of the plurality of RGB pixel values to have special values; receiving video data having a first plurality of RGB pixel values for display on a video screen; superimposing a character on the video data to create a composite video having a second plurality of RGB pixel values for display on a video screen; determining if a first RGB pixel value from the second plurality of RGB pixel values is in the designated portion of the plurality of RGB pixel values; displaying the first RGB pixel value if the first RGB pixel value is not in the designated portion of the plurality of RGB pixel values; determining the special value for the first RGB pixel value if first the RGB pixel value is in the designated portion of the plurality of RGB pixel values; and displaying the determined special value for the first RGB pixel value.

2. A method as recited in claim 1, wherein said step of determining the special value for the first RGB pixel value comprises using a lookup table to determine the special value.

3. A method as recited in claim 1, wherein said step of designating a portion of the plurality of RGB pixel values to have special values comprises creating a lookup table having special values for a plurality of entries for a color with a plurality of different alpha values.

4. A method as recited in claim 3, wherein said creating step comprises creating a lookup table having two RGB colors with a plurality of alpha values to blend from a first color of the two RGB colors to a second color of the two RGB colors.

5. A method as recited in claim 4, wherein said creating step comprises creating a lookup table having a special value so that an RGB pixel value will be transparent.

6. A method as recited in claim 3, wherein said creating step comprises creating a lookup table having a special value for a background color.

7. A method as recited in claim 6, wherein said creating step comprises creating a lookup table having special values for a plurality of alpha values to blend the first color to the background color.

8. A method as recited in claim 4, wherein said creating step comprises a lookup table having a special value for a background color.

9. A method as recited in claim 8, wherein said creating step comprises creating a lookup table having special values for a plurality of alpha values to blend the first color to the background and a plurality of alpha values to blend the second color to the background.

10. A method as recited in claim 1, wherein said step of determining if a first RGB pixel value from the second plurality of RGB pixel values is in the designated portion of the plurality of RGB pixel values comprises determining if one of the RGB pixel values is greater than a predetermined value.

11. A method as recited in claim 1, wherein said step of determining if a first RGB pixel value from the second plurality of RGB pixel values is in the designated portion of the plurality of RGB pixel values comprises determining if one of the RGB pixel values is in a range of predetermined values.

12. A method as recited in claim 10, wherein said step of determining if one of the RGB pixel values is greater than a predetermined value comprises determining if one of the RGB pixel values is greater than a value near the maximum value for RGB pixel values.

13. A method as recited in claim 5, wherein said step of designating a portion of the plurality of RGB pixel values to have special values comprises choosing a set of pixels near the maximum value for RGB pixel values such that the first color, second color and transparent are located on different vertices of a cube having R, G, and B plotted on different axes.

14. A method as recited in claim 1, wherein said step of designating a portion of the plurality of RGB pixel values to have special values further comprises choosing a different vertex for a background color.

15. A method as recited in claim 1 wherein said step of displaying the first RGB pixel value comprises the step of multiplying the first RGB pixel value by X/Y where X is the number of possible pixel values minus the number of pixel values designated to have special values and Y is the number of possible pixel values.

16. A method as recited in claim 1 wherein said step of displaying the first RGB pixel value comprises the step of displaying the first RGB pixel value if the first RGB pixel value is less than or equal to X, where X is the number of possible pixel values minus the number of pixel values designated to have special values, and displaying the maximum pixel value X if the first RGB pixel value is greater than X.

17. An apparatus for superimposing a character on video for display on a video screen comprising: a processor for displaying a plurality of RGB pixel values on a video screen, said processor designating a portion of the plurality of RGB pixel values to have special values; an input for receiving video data having a first plurality of RGB pixel values for display on a video screen; said processor being adapted to superimpose a character on the video data received by said input to create a composite video having a second plurality of RGB pixel values for display on a video screen; said processor determining if a first RGB pixel value from the second plurality of RGB pixel values is in the designated portion of the plurality of RGB pixel values and generating a signal to display the first RGB pixel value if the first RGB pixel value is not in the designated portion of the plurality of RGB pixel values and generating a signal to display the special value for the first RGB pixel value if the first RGB pixel value is in the designated portion of the plurality of RGB pixel values.

18. An apparatus as recited in claim 17 wherein said processor comprises memory and a lookup table stored in said memory, said lookup table containing the special values for the designated plurality of RGB pixel values.

19. An apparatus as recited in claim 18 wherein said lookup table contains a plurality of entries for a color with a plurality of different alpha values.

* * * * *